United States Patent
Du et al.

(10) Patent No.: US 10,965,173 B2
(45) Date of Patent: Mar. 30, 2021

(54) DISTANCE DETECTION METHODS AND SYSTEMS FOR WIRELESS POWER TRANSMISSION DEVICE

(71) Applicant: DELTA ELECTRONICS, INC., Taoyuan (TW)

(72) Inventors: Shuailin Du, Taoyuan (TW); Yongkai Liao, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/708,459

(22) Filed: Dec. 10, 2019

(65) Prior Publication Data

US 2020/0204012 A1    Jun. 25, 2020

(30) Foreign Application Priority Data

Dec. 20, 2018 (CN) .......................... 201811562285.2

(51) Int. Cl.
*H02J 50/90* (2016.01)
*H02J 50/80* (2016.01)
*H02J 50/12* (2016.01)

(52) U.S. Cl.
CPC .............. *H02J 50/90* (2016.02); *H02J 50/12* (2016.02); *H02J 50/80* (2016.02)

(58) Field of Classification Search
CPC ............. H02J 50/12; H02J 50/80; H02J 50/90

USPC .......................................................... 307/104
See application file for complete search history.

(56) References Cited

U.S. PATENT DOCUMENTS

| 10,411,525 B2* | 9/2019 | Weidner | H02J 50/12 |
| 2015/0130294 A1* | 5/2015 | Suzuki | B60L 53/65 |
| | | | 307/104 |
| 2016/0233725 A1* | 8/2016 | Yoon | H02J 7/025 |
| 2018/0287434 A1* | 10/2018 | Il | B60L 53/122 |

FOREIGN PATENT DOCUMENTS

| CN | 104471822 A | 3/2015 |
| CN | 104734369 A | 6/2015 |
| CN | 105634145 A | 6/2016 |

* cited by examiner

*Primary Examiner* — William Hernandez
(74) *Attorney, Agent, or Firm* — CKC & Partners Co., LLC

(57) ABSTRACT

A distance detection method and system for a wireless power transmission device are disclosed. The wireless power transmission device includes a transmitter circuit and a receiver circuit, wherein a transmitting coil of the transmitter circuit and a receiving coil of the receiver circuit form an inductive circuit via magnetic coupling. The distance detection method includes: calculating an inductance value of a magnetizing inductance of the inductive circuit according to electrical parameters of the receiver circuit and electrical parameters of the transmitter circuit; and calculating a distance between the transmitting coil and the receiving coil according to the inductance value of the magnetizing inductance of the inductive circuit.

19 Claims, 7 Drawing Sheets

DISTANCE DETECTION METHODS AND SYSTEMS FOR WIRELESS POWER TRANSMISSION DEVICE

CROSS REFERENCE

This application is based upon and claims priority to Chinese Patent Application No. 201811562285.2, filed on Dec. 20, 2018, the entire content thereof is incorporated herein by reference.

TECHNICAL FIELD

The present invention relates to a wireless power transmission device, and more particularly to distance detection methods and systems for a wireless power transmission device.

BACKGROUND

In a wireless power transmission system, the distance between transmission coils (for example, transmitting coils and receiving coils) is an important factor and can impact on system efficiency, power capacity of the transmission system, and stability of the system operation. In conventional control method, the distance between the transmission coils is detected and the system efficiency or the power capacity of the transmission system is optimized by adjusting said distance.

Currently, however, sensors or detection devices related to optics, acoustics, magnetic field or the like are used for the distance detection. For optical or acoustic related sensors, there are shortcomings such as not easy to mount and vulnerable to obstacles; and for magnetic field related sensors, since sensors need to be mounted near the transmission coils, the volume of the transmission coil may be increased and more detection signal are required, so that the system design may be relatively complex.

FIG. 1 shows a system for detecting the distance between transmission coils according to the prior art, and FIG. 2 shows the distribution of a plurality of coil sensors. As shown in FIGS. 1 and 2, the plurality of coil sensors 110 are used to detect magnetic field intensity at different positions of secondary coil 21, and the position information of the transmission coils is determined by comparison between different magnetic field intensities. But in applications where the circuit module is separated from the transmission coils, more detection/control signal wires between the circuit module and the transmission coils are required, and the coil sensors 110 increase the volume of the transmission coil.

Therefore, there is a need of a distance detection method and system for a wireless power transmission device that can overcome one or more of the above deficiencies.

SUMMARY

In view of this, it is an object of the present invention to provide a distance detection method and a system for a wireless power transmission device that calculates the magnetizing inductance of transmission coils by detecting the electrical parameters of a circuit module and thereby derives the distance between the transmission coils, so as to overcome one or more deficiencies in the prior art.

In order to achieve the above object, the present invention provides a distance detection method for a wireless power transmission device, wherein the wireless power transmission device comprises a transmitter circuit having a transmitting coil and a receiver circuit having a receiving coil, wherein the transmitting coil of the transmitter circuit and the receiving coil of the receiver circuit are magnetically coupled to form an inductive circuit with a magnetizing inductance. The distance detection method comprises:

calculating an inductance value of the magnetizing inductance of the inductive circuit according to electrical parameters of the receiver circuit and electrical parameters of the transmitter circuit; and calculating a distance between the transmitting coil and the receiving coil according to the inductance value of the magnetizing inductance of the inductive circuit.

In order to achieve the above object, the present invention further provides a distance detection system for a wireless power transmission device, wherein the wireless power transmission device comprises a transmitter circuit having a transmitting coil and a receiver circuit having a receiving coil, wherein the transmitting coil of the transmitter circuit and the receiving coil of the receiver circuit are magnetically coupled to form an inductive circuit with a magnetizing inductance. The distance detection system comprises:

a transmitter detection unit configured to detect electrical parameters of the transmitter circuit;

a receiver detection unit configured to detect electrical parameters of the receiver circuit;

a distance calculation unit disposed at a transmitter or a receiver of the wireless power transmission device;

a data transmission unit configured to transmit the electrical parameters of the receiver circuit or the electrical parameters of the transmitter circuit to the distance calculation unit by wireless communication or power line carrier communication;

wherein the distance calculation unit is configured to calculate an inductance value of the magnetizing inductance of the inductive circuit according to the electrical parameters of the receiver circuit and the electrical parameters of the transmitter circuit, and to calculate a distance between the transmitting coil and the receiving coil according to the inductance value of the magnetizing inductance of the inductive circuit.

The present invention can solve the deficiencies in the prior art effectively by detecting certain electrical parameters of a circuit module, then calculating an inductance value of an inductive circuit formed by magnetic coupling of the transmission coils, and consequently deriving the distance between the transmission coils. In the present invention, since the signals detected by the detection circuits of the distance detection system, such as the transmitter detection unit and the receiver detection unit, are electrical signals which depend on relative position between and operating status of the transmission coils, they may not be affected by obstacles;

and since the detection circuits are on the circuit module, mounting may not be affected and the signal detection lines between the circuit module and the transmission coils may not be increased.

Hereinafter, the above description will be described in detail with reference to implementations, and a further explanation of the technical solution of the present invention will be provided.

BRIEF DESCRIPTION OF THE DRAWINGS

To make the above and other objects, features, advantages and embodiments of the present invention more apparent, a brief description of the drawings is provided as follows.

DETAILED DESCRIPTION

Figure 1:
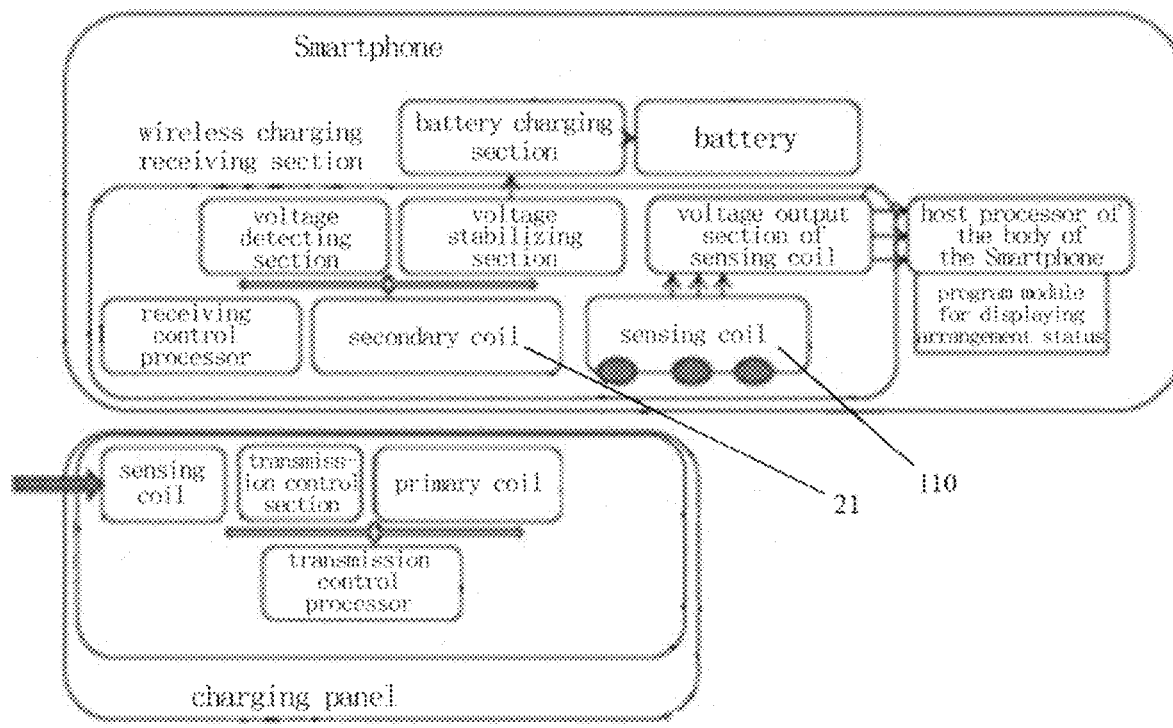
FIG. 1 depicts a system for detecting a distance between transmission coils in the prior art.
Figure 2:
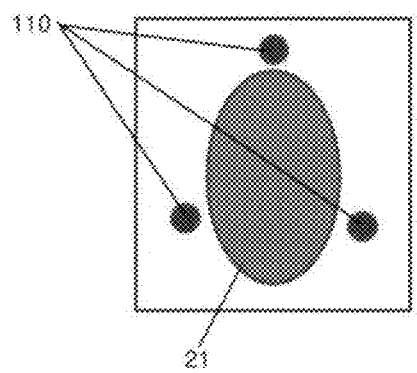
FIG. 2 is a schematic view showing the distribution of a plurality of coil sensors (the sensing coils in FIG. 1, for example)

In order to make the description of the present invention more elaborate and complete, reference may be made to the accompanying drawings and the various examples described below, and the same numerals in the drawings represent the same or similar components. On the other hand, well-known components and steps are not described in the embodiments to avoid an unnecessary limitation of the present invention. In addition, for the sake of simplicity of the drawings, some of the conventional structures and elements already known will be shown in simplified illustration in the drawings.

The present invention relates to a distance detection method and system for a wireless power transmission device. The wireless power transmission device of the present invention comprises a transmitter circuit and a receiver circuit, wherein the transmitter circuit comprises transmitting coil and the receiver circuit comprises receiving coil. The transmitting coil of the transmitter circuit and the receiving coil of the receiver circuit are magnetically coupled to form an inductive circuit with a magnetizing inductance. In particular, by detecting electrical parameters of the respective circuit, the inductance value $L_m$ of the magnetizing inductance of the inductive circuit can be calculated, and a distance between the transmission coils (i.e., transmitting coil and the receiving coil) may be derived or calculated from the inductance value $L_m$ of the magnetizing inductance.

Figure 3:
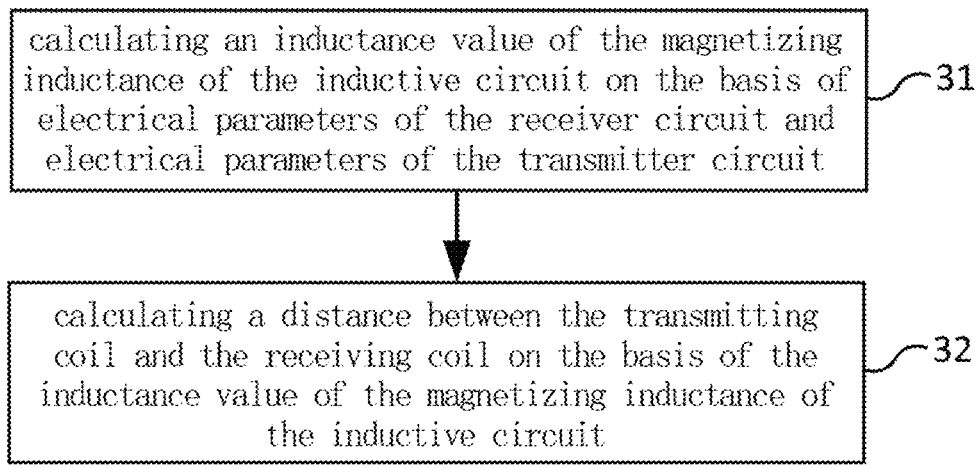
FIG. 3 is a flowchart of a distance detection method for a wireless power transmission device according to a preferred embodiment of the present invention.

As shown in FIG. 3, a distance detection method for a wireless power transmission device according to a preferred embodiment of the present invention is shown, which includes the following steps:

step 31, calculating an inductance value $L_m$ of the magnetizing inductance of an inductive circuit according to electrical parameters of a receiver circuit and electrical parameters of a transmitter circuit;

step 32, calculating a distance between the transmitting coil and the receiving coil according to the inductance value of the magnetizing inductance of the inductive circuit.

In step 31, electrical parameters of the receiver circuit may include a detected voltage related to output voltage of the receiver circuit, and electrical parameters of the transmitter circuit may include a current and an operating frequency of the transmitter circuit.

Moreover, preferably, the inductance value $L_m$ of the magnetizing inductance of the inductive circuit may be calculated according to an equivalent voltage $V_{eq}$ of the transmitting coil, a reactive current $I_{t\_r}$ of the transmitting coil, and an operating frequency $f_s$ of the transmitter circuit, wherein the equivalent voltage $V_{eq}$ of the transmitting coil may be obtained by voltage reduction of the output voltage of the receiver circuit.

For example, the inductance value $L_m$ of the magnetizing inductance of the inductive circuit may be calculated according to the following relation:

$$L_m = \frac{V_{eq}}{2\pi f_s I_{t\_r}}$$

wherein $V_{eq}$ is the equivalent voltage of the transmitting coil, $I_{t\_r}$ is the reactive current of the transmitting coil, and $f_s$ is the operating frequency of the transmitter circuit. The specific detection method and calculation process for the respective electrical parameters will be described in detail later.

In step 32, the distance between the transmitting coil and the receiving coil may be obtained by look-up table method or curve fitting method. The methods will also be described in detail later.

Figure 4:
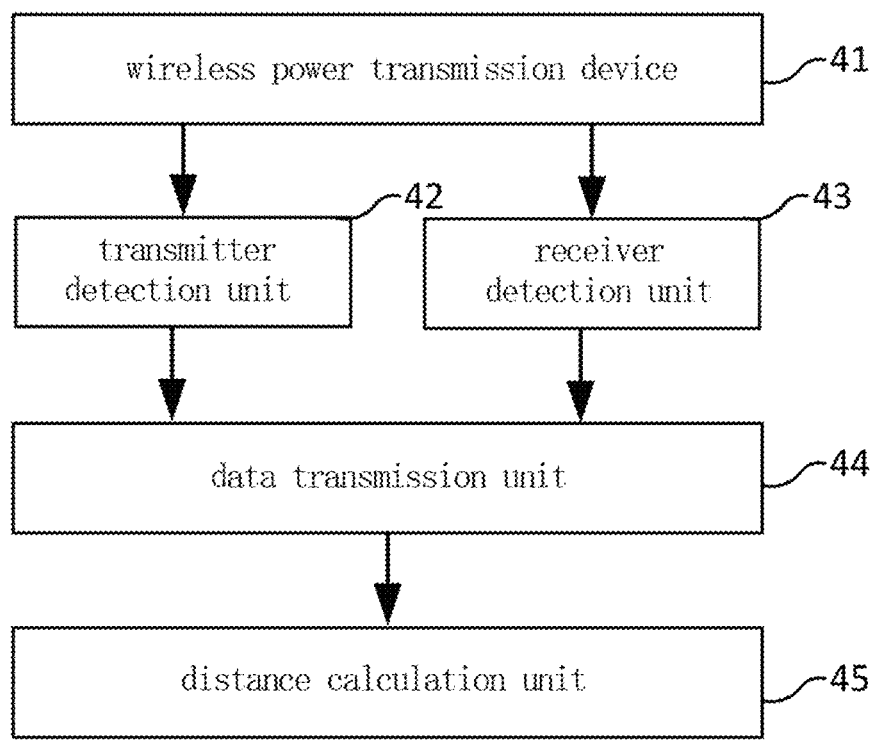
FIG. 4 is a schematic structural view of a distance detection system for a wireless power transmission device according to a preferred embodiment of the present invention.

FIG. 4 shows the structure of a distance detection system for a wireless power transmission device according to a preferred embodiment of the present invention. The distance detection system of the wireless power transmission device of the present invention may be electrically connected to the wireless power transmission device 41, so as to detect a distance between transmission coils (i.e., the transmitting coil and the receiving coil). The distance detection system comprises a transmitter detection unit 42, a receiver detection unit 43, a data transmission unit 44 and a distance calculation unit 45. The transmitter detection unit 42 may be electrically connected to the transmitter circuit of the wireless power transmission device and is configured to detect electrical parameters of the transmitter circuit. The receiver detection unit 43 may be electrically connected to the receiver circuit of the wireless power transmission device and is configured to detect electrical parameters of the receiver circuit. The distance calculation unit 45 may be disposed at a transmitter or a receiver of the wireless power transmission device. The data transmission unit 44 is configured to transmit the electrical parameters of the receiver circuit or the electrical parameters of the transmitter circuit to the distance calculation unit 45 via wireless communication or power line carrier communication. The distance calculation unit 45 is configured to calculate an inductance value of the magnetizing inductance of the inductive circuit according to the electrical parameters of the receiver circuit and the electrical parameters of the transmitter circuit, and to calculate the distance between the transmitting coil and the receiving coil according to the inductance value of the magnetizing inductance of the inductive circuit.

Figure 5A:
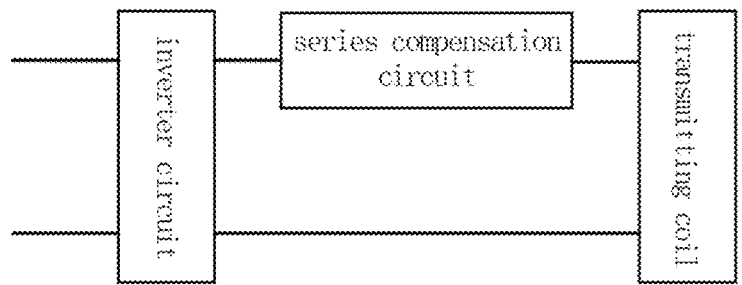
FIG. 5A is a schematic view of a preferred embodiment of a transmitter circuit of the wireless power transmission device of FIG. 4.

As shown in FIG. 5A, the transmitter circuit of the wireless power transmission device may comprise an inverter circuit, a series compensation circuit, and a transmitting coil, wherein the inverter circuit may be a half-bridge inverter circuit or a full-bridge inverter circuit and be electrically connected to input power so as to receive input DC power and convert it into AC power. The transmitting coil is configured to transmit the AC power. The series compensation circuit is electrically connected between the inverter circuit and the transmitting coil to compensate for part of the reactive power of the transmitting coil.

Figure 5B:
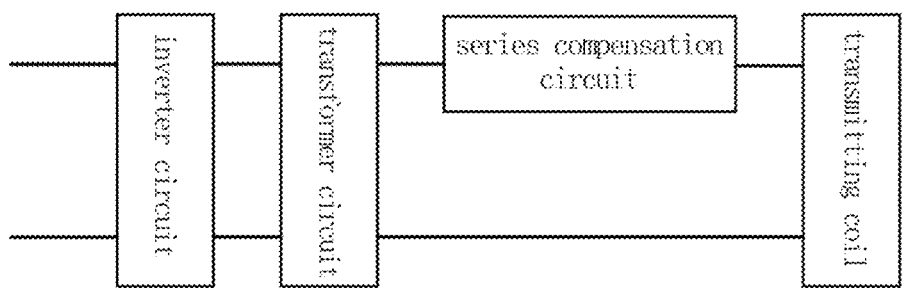
FIG. 5B is a schematic view of another preferred embodiment of the transmitter circuit of the wireless power transmission device of FIG. 4, wherein the transmitter circuit further comprises a transformer circuit.

In other embodiments, the transmitter circuit of the wireless power transmission device may further comprise a transformer circuit, such as a transformer, which is electrically connected between the inverter circuit and the series compensation circuit, as shown in FIG. 5B, for achieving voltage conversion.

Figure 6A:
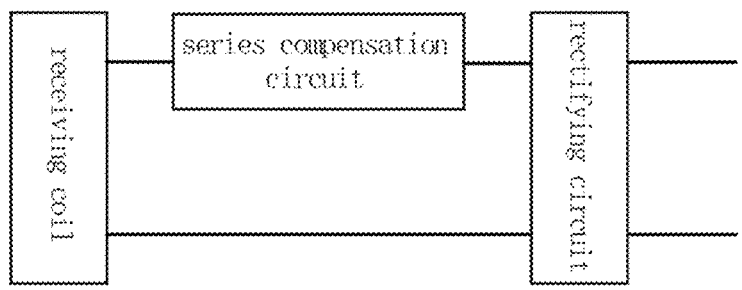
FIG. 6A is a schematic view of a preferred embodiment of a receiver circuit of the wireless power transmission device of FIG. 4.

As shown in FIG. 6A, the receiver circuit of the wireless power transmission device may comprise the receiving coil, the series compensation circuit, and a rectifying circuit. The receiving coil is configured to receive the AC power transmitted by the transmitting coil. The series compensation circuit is electrically connected between the receiving coil and the rectifying circuit to compensate for part of the reactive power of the receiving coil. The rectifying circuit is electrically connected to the series compensation circuit for receiving AC power and converting it into DC power, wherein the rectifying circuit may be full-wave rectifying circuit or full-bridge rectifying circuit.

Figure 6B:
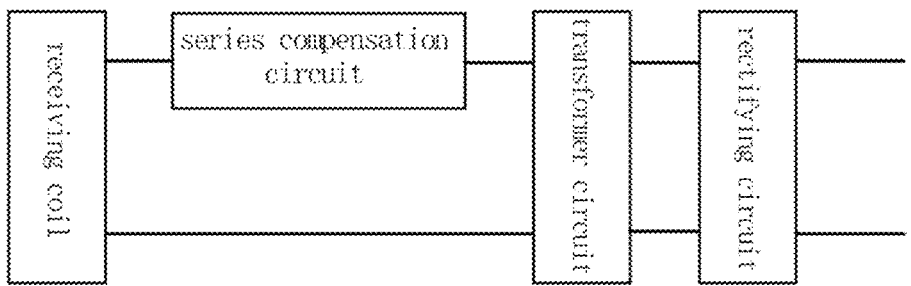
FIG. 6B is a schematic view of another preferred embodiment of the receiver circuit of the wireless power transmission device of FIG. 4, wherein the receiver circuit further comprises a transformer circuit.

In other embodiments, the receiver circuit of the wireless power transmission device may further comprise a transformer circuit, such as a transformer, which is electrically connected between the rectifying circuit and the series compensation circuit, as shown in FIG. 6B, for achieving voltage conversion.

In the present invention, the transmitter detection unit 42 may comprise a reactive current detection circuit for the transmitting coil and an operating frequency detection circuit for the inverter circuit.

Figure 7A:
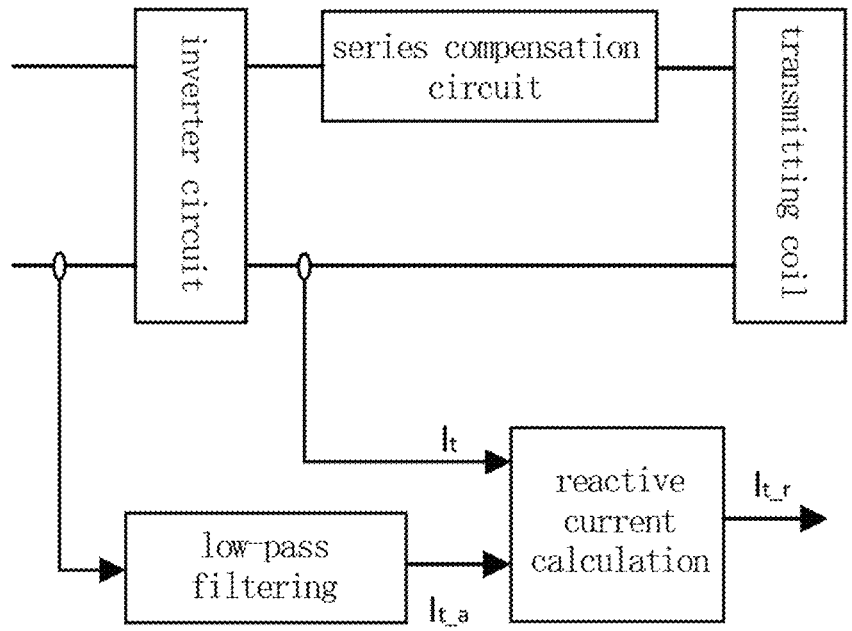
FIG. 7A is a schematic structural view of a preferred embodiment in which a transmitter detection unit is used to detect a reactive current of a transmitting coil of a transmitter circuit.

The reactive current detection circuit for the transmitting coil is configured to obtain the reactive current $I_{t\_r}$ of the transmitting coil, wherein the reactive current $I_{t\_r}$ of the transmitting coil may be obtained by one of the following methods:

In the first method, as shown in FIG. 7A, firstly a total current $I_t$ and an active current $I_{t\_a}$ of the transmitting coil are obtained, and then the reactive current $I_{t\_r}$ of the transmitting coil is calculated according to $I_{t\_r}=\sqrt{I_t^2-I_{t\_a}^2}$, wherein the active current $I_{t\_a}$ may be obtained by low-pass filtering using a low-pass filter, and the reactive current $I_{t\_r}$ of the transmitting coil may be obtained by reactive current calculation on the total current $I_t$ and the active current $I_{t\_a}$ of the transmitting coil by using a reactive current calculation module.

Figure 7B:
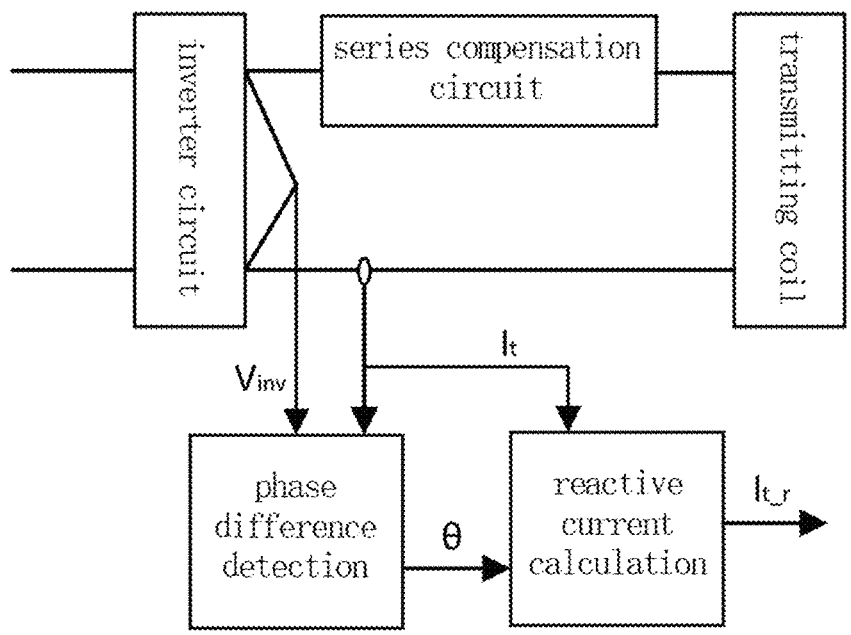
FIG. 7B is a schematic structural view of another preferred embodiment in which a transmitter detection unit is used to detect a reactive current of a transmitting coil of a transmitter circuit.

In the second method, as shown in FIG. 7B, firstly a total current $I_t$ of the transmitting coil and a phase difference θ between an output voltage $V_{inv}$ of the inverter circuit of the transmitter circuit and the total current $I_t$ are obtained, and then the reactive current $I_{t\_r}$ of the transmitting coil is calculated according to $I_{t\_r}=I_t*\sin(θ)$, wherein the phase difference θ may be obtained by detecting a phase difference between the output voltage $V_{inv}$ of the inverter circuit of the transmitter circuit and the total current $I_t$ using a phase difference detection module, and the reactive current $I_{t\_r}$ of the transmitting coil may be obtained by reactive current calculation on the total current $I_t$ and the phase difference θ by using a reactive current calculation module.

The operating frequency detection circuit for inverter circuit is configured to detect an operating frequency $f_s$ of the inverter circuit, which serves as an operating frequency of the transmitter circuit and may be obtained directly from a controller or be detected by a hardware circuit.

Figure 8A:
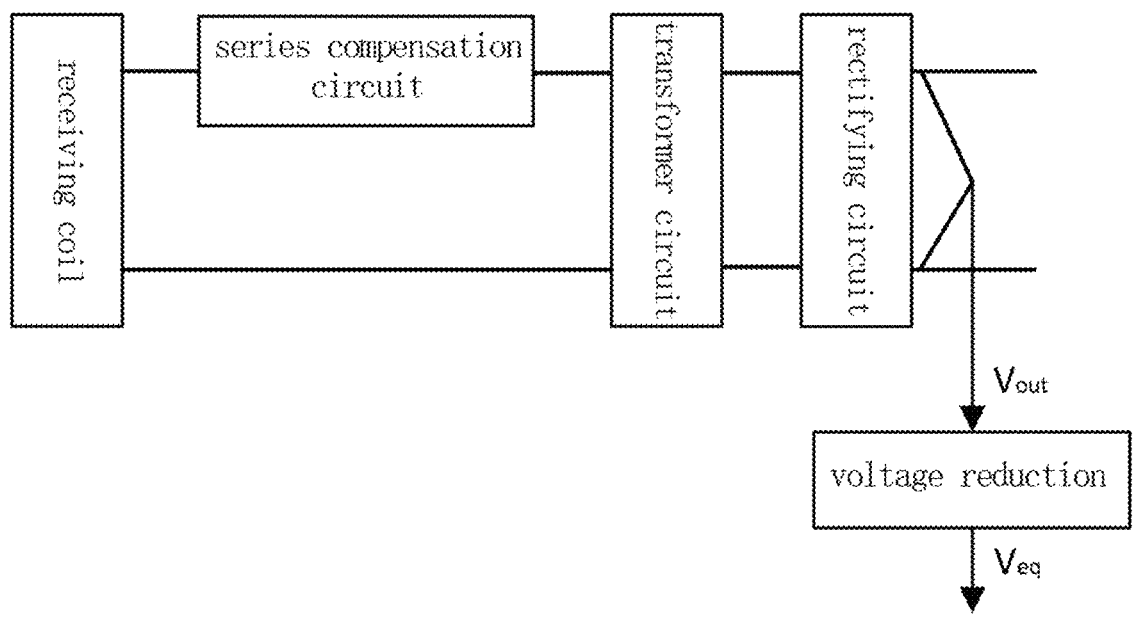
FIG. 8A is a schematic structural view of a preferred embodiment in which a receiver detection unit is used to detect an output voltage $V_{out}$ of a rectifying circuit of a receiver circuit so as to obtain the equivalent voltage $V_{eq}$ reduced to the transmitting coil.

In the present invention, the receiver detection unit is configured to obtain the equivalent voltage $V_{eq}$ of the transmitting coil by one of the following methods:

In the first method, as shown in FIG. 8A, firstly an output voltage $V_{out}$ of the rectifying circuit of the receiver circuit is obtained, and then voltage reduction of the output voltage $V_{out}$ of the rectifying circuit is performed to obtain the equivalent voltage $V_{eq}$ of the transmitting coil. Here taking the receiver circuit comprising a transformer circuit as shown in FIG. 6B as an example, wherein the transformer circuit is, for example, a transformer, with a turns ratio of the primary side to the secondary side of, for example, $N_p:N_s$ and a turns ratio of the transmitting coil to the receiving coil of, for example, $N_t:Nr$, the effective value of the AC voltage before the rectifying circuit is $$\frac{2\sqrt{2}}{\pi}V_{out},$$

and subsequently the effective value of the equivalent voltage of the transmitting coil that is reduced to the transmitter via the receiving coil and the transformer circuit (such as a transformer) is $$V_{eq} = \frac{2\sqrt{2}\,N_p \times N_t}{\pi N_s \times N_r}V_{out}.$$

Figure 8B:
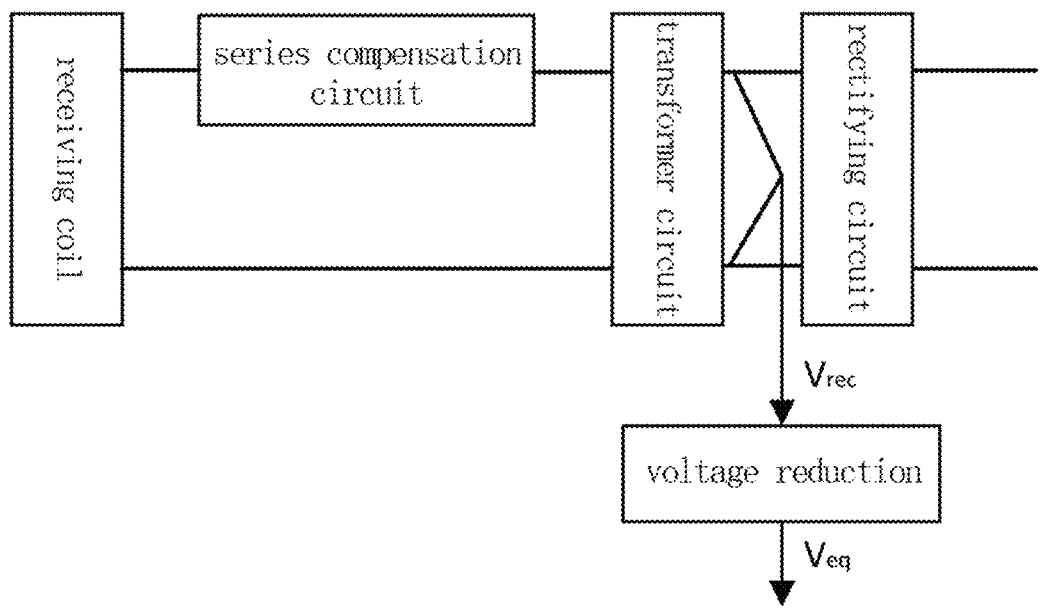
FIG. 8B is a schematic structural view of another preferred embodiment in which a receiver detection unit is used to detect an output voltage $V_{out}$ of a rectifying circuit of a receiver circuit so as to obtain the equivalent voltage $V_{eq}$ reduced to the transmitting coil.

In the second method, as shown in FIG. 8B, firstly an AC voltage $V_{rec}$ before the rectifying circuit of the receiver circuit may be obtained, and then voltage reduction of the AC voltage $V_{rec}$ before the rectifying circuit is performed to obtain the equivalent voltage $V_{eq}$ of the transmitting coil. Here taking the receiver circuit comprising the transformer circuit as shown in FIG. 6B as an example, the equivalent voltage $V_{eq}$ of the transmitting coil of the transmitter may be obtained by reducing the turns ratio in a similar manner as that in the first method described above.

In the present invention, since the transmitter detection unit and the receiver detection unit are disposed at the transmitter and the receiver, respectively, it is necessary to transmit the detected data to the distance calculation unit via the data transmission unit.

When the distance calculation unit is disposed at the transmitter, the electrical parameters of the receiver circuit may be transmitted to the distance calculation unit via wireless communication or power line carrier communication, so as to be calculated with the electrical parameters of the transmitter circuit.

When the distance calculation unit is disposed at the receiver, the electrical parameters of the transmitter circuit may be transmitted to the distance calculation unit via wireless communication or power line carrier communication, so as to be calculated with the electrical parameters of the receiver circuit.

In the present invention, the distance calculation unit calculates the inductance value $L_m$ of the magnetizing inductance of the inductive circuit formed by the magnetic coupling of the transmitting coil and the receiving coil according to the data transmitted by the data transmission unit, and then derives the distance between the transmitting coil and the receiving coil based on a corresponding relation between the magnetizing inductance $L_m$ and the distance.

Figure 9A:
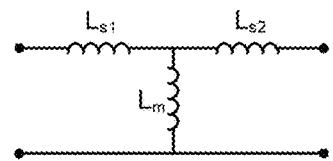
FIG. 9A is an equivalent circuit diagram of a coupling relationship between a transmitting coil and a receiving coil of the present invention.
Figure 9B:
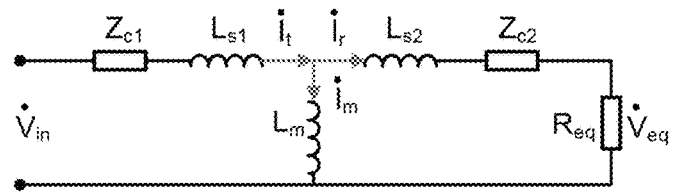
FIG. 9B is an equivalent circuit diagram of a coupling relationship when the compensation circuit of the wireless power transmission device of the present invention is in series compensation.

The specific method for calculating the distance between the transmitting coil and the receiving coil is as follows:

First, the coupling relation between the transmitting coil and the receiving coil can be equivalent to the circuit shown in FIGS. 9A and 9B, wherein $L_{s1}$ is the leakage inductance of the transmitting coil, $L_{s2}$ is the equivalent leakage inductance of the receiving coil that is reduced to the transmitting coil, and $L_m$ is the magnetizing inductance that is reduced to the transmitting coil. The compensation circuits of both the transmitter circuit and the receiver circuit of the wireless power transmitting device are series compensation, wherein $Z_{c1}$ is the compensation impedance of the transmitter circuit, $Z_{c2}$ is the compensation impedance of the receiver circuit, and the operation is performed under the condition that $Z_{c1}$ compensates for the leakage inductance $L_{s1}$ of the transmitting coil and $Z_{c2}$ compensates for the leakage inductance $L_{s2}$ of the receiving coil.

During power transmission, the inverter circuit operates at a frequency proximate to a resonant frequency. Taking a vector angle of the input voltage $V_{in}$ as reference, a vector angle of an equivalent voltage $V_{eq}$ reduced to the transmitting coil is close to 0, $i_t = i_r + i_m$, and a reactive current of the transmitting coil is approximate to $$I_{t\_r} = \frac{V_{eq}}{2\pi f_s L_m},$$

thus $$L_m = \frac{V_{eq}}{2\pi f_s I_{t\_r}}$$

may be derived, wherein the reactive current $I_{t\_r}$ of the transmitting coil, the operating frequency $f_s$ of the inverter circuit, and the equivalent voltage $V_{eq}$ reduced to the transmitting coil may be obtained all by detection or reduction, so that the magnetizing inductance $L_m$ reduced to the transmitting coil may be obtained.

The distance between the transmitting coil and the receiving coil may be derived from the correspondence relationship between the distance and the magnetizing inductance $L_m$. For example, the distance between the transmitting coil and the receiving coil may be obtained by look-up table method or curve fitting method.

The look-up table method may comprise:

(1) setting the distance between the transmitting coil and the receiving coil to be a plurality of different distance values, such as 0 mm, 1 mm, 2 mm, 3 mm, . . . , and measuring the corresponding magnetizing inductance values of the magnetizing inductance of the inductive circuit at the plurality of different distance values, respectively;

(2) creating a table including a correspondence relationship between the magnetizing inductance values and the distance values according to the results obtained by the measurements, wherein the values obtained by the measurements may be used directly into the table; of course, certain distance values and magnetizing inductance values may also be interpolated linearly between the plurality of different distance values of the table according to the results obtained by the measurements, thereby increasing the accuracy of the table; and (3) querying which two adjacent distance values out from the table form a distance range (gap_n, gap_n+1) corresponding to a magnetizing inductance value range that the calculated inductance value $L_m$ of the magnetizing inductance of the inductive circuit falls into, and taking one of the two adjacent distance values gap_n or gap_n+1 as the distance between the transmitting coil and the receiving coil.

The curve fitting method may comprise:

(1) setting the distance between the transmitting coil and the receiving coil to be a plurality of different distance values, such as 0 mm, 1 mm, 2 mm, 3 mm, . . . , and measuring the corresponding magnetizing inductance values of the magnetizing inductance of the inductive circuit at the plurality of different distance values, respectively;

(2) obtaining a relation gap=f($L_m$) between the distance value and the magnetizing inductance value by curve fitting method according to the results obtained by the measurements; and (3) calculating the distance between the transmitting coil and the receiving coil according to the calculated inductance value $L_m$ of the magnetizing inductance of the inductive circuit and the relation gap=f($L_m$).

The distance detection method of the present invention will be described in detail below with reference to the embodiments shown in FIGS. 10A and 10B.

Figure 10A:
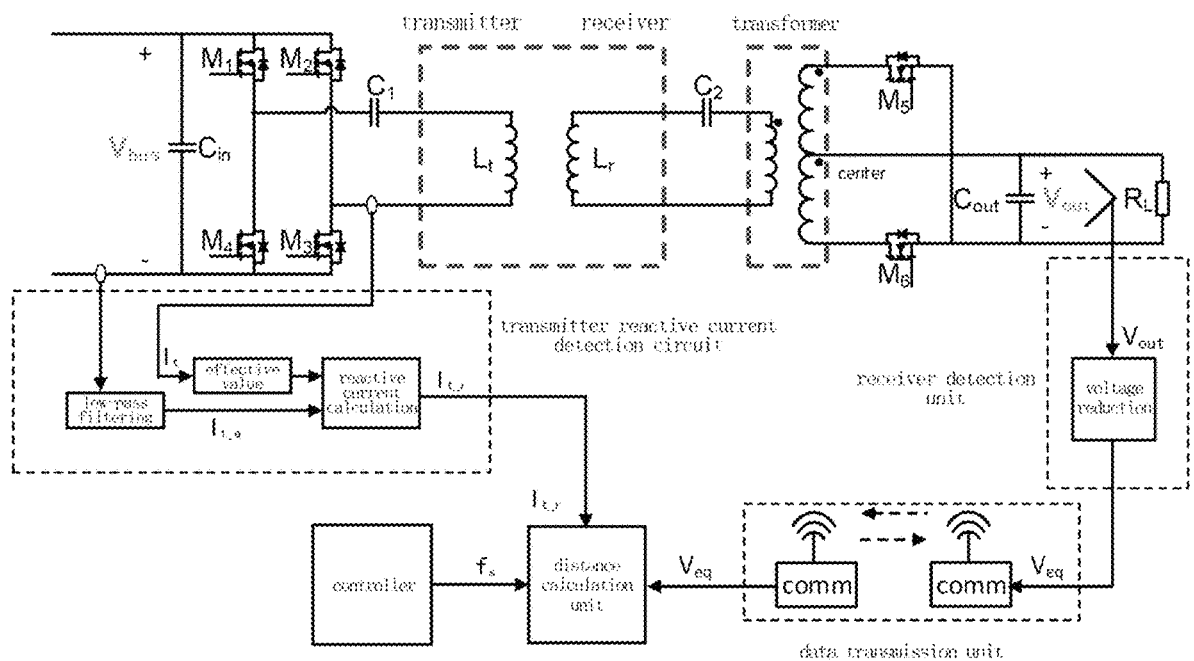
FIG. 10A is a schematic structural view where the distance detection system of the wireless power transmission device of the present invention is applied in an embodiment for distance detection, wherein the receiver circuit contains a transformer, and the rectifying circuit is full-wave rectifying circuit.

FIG. 10A shows a structure in which the distance detection system of the wireless power transmission device of the present invention is applied for distance detection in one embodiment, wherein the inverter circuit of the transmitter circuit of the wireless power transmission device is a full-bridge inverter circuit, and the series compensation circuit is series capacitance $C_1$ compensation. The rectifying circuit of the receiver circuit is a full-wave rectifier and contains a transformer. The turns ratio of the primary side to the secondary side of the transformer is $N_p:N_s$, and the series compensation circuit is series capacitance $C_2$ compensation. The turns ratio of the transmitting coil to the receiving coil is 1:1.

The reactive current $I_{t\_r}$ of the transmitting coil is detected by the transmitter reactive current detection circuit of the transmitter detection unit under the first method described above, that is, by detecting the total current $I_t$ and the active current $I_{t\_a}$ of the transmitting coil, and then calculating the reactive current $I_{t\_r}$ of the transmitting coil according to $I_{t\_r} = \sqrt{I_t^2 - I_{t\_a}^2}$; and the operating frequency $f_s$ is obtained directly from a digital controller.

It is the output voltage $V_{out}$ of the rectifying circuit that is detected by the receiver detection unit, and then the equivalent voltage reduced to the transmitting coil conforms to $$V_{eq} = \frac{2\sqrt{2} N_p}{\pi N_s} V_{out}.$$

The data transmission unit comprises a transmitter communication module and a receiver communication module. The receiver communication module receives a signal of the equivalent voltage $V_{eq}$ reduced to the transmitting coil, and transmits the signal to the transmitter communication module. The transmitter communication module transmits the signal of the equivalent voltage $V_{eq}$ reduced to the transmitting coil to the distance calculation unit.

The distance calculation unit calculates the magnetizing inductance $L_m$ reduced to the transmitting coil according to a signal of the reactive current $I_{t\_r}$ detected by the transmitter reactive current detection circuit of the transmitter detection unit, a signal of the operating frequency $f_s$ obtained from the digital controller, a signal of the equivalent voltage $V_{eq}$ of the transmitting coil that is transmitted from the receiver, as well as the relationship $$L_m = \frac{V_{eq}}{2\pi f_s I_{t\_r}};$$

then calculates or derive the distance between the transmission coils, i.e., the distance between the transmitting coil and the receiving coil, according to the correspondence relationship between the magnetizing inductance $L_m$ actually measured and the distance between the transmission coils (for example, by look-up table method or curve fitting method).

Figure 10B:
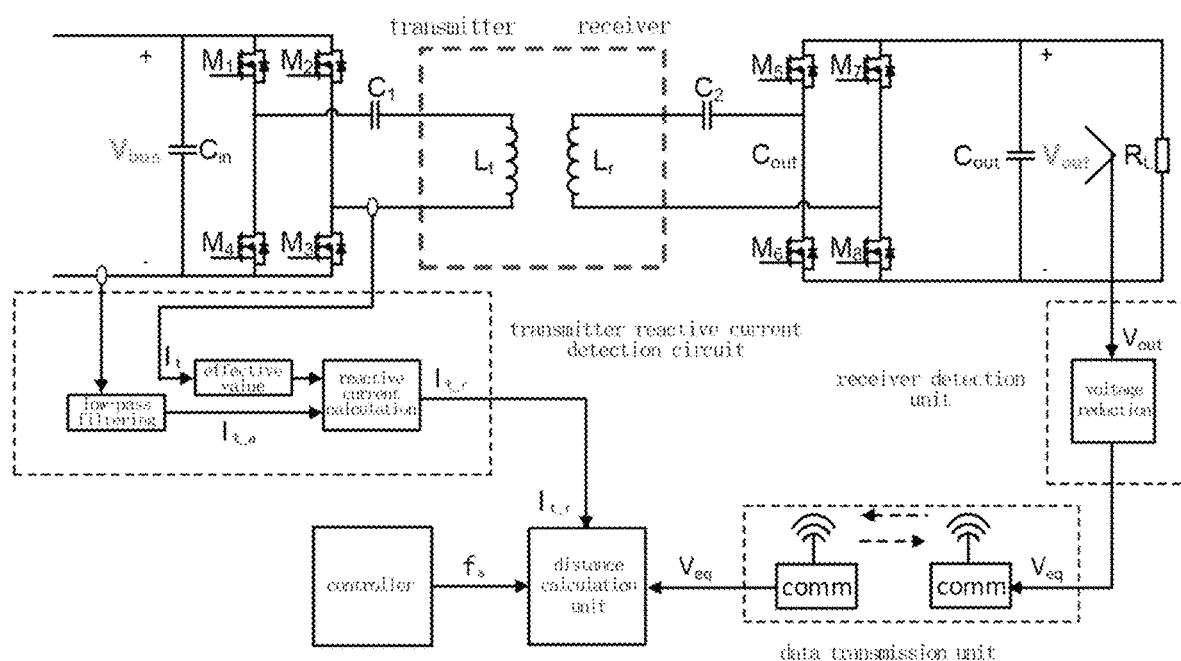
FIG. 10B is a schematic structural view where the distance detection system of the wireless power transmission device of the present invention is applied in another embodiment for distance detection, wherein the receiver circuit does not contain a transformer.

FIG. 10B shows a structure in which the distance detection system of the wireless power transmission device of the present invention is applied in another embodiment for distance detection. One of the differences from FIG. 10A is that the receiver circuit does not contain a transformer. Nevertheless, the distance between the transmitting coil and the receiving coil may also be calculated or derived by a method similar to that of FIG. 10A.

In summary, the present invention can solve the deficiencies in the prior art effectively by detecting certain electrical parameters of circuit modules, then calculating an inductance value of a magnetizing inductance of an inductive circuit formed by the magnetic coupling of the transmission coils, and consequently calculating or deriving the distance between the transmission coils.

In the present invention, since the signals detected by the detection circuits of the distance detection system, such as the transmitter detection unit and the receiver detection unit, are electrical signals which depend on relative position and operating status of the transmission coils, they may not be affected by obstacles; and since the detection circuit are on the circuit module, mounting of transmission coils may not be affected and the signal detection wires between the circuit module and the transmission coils may not be increased, so that the designs of the circuit module and the transmission coils are more flexible.

While embodiments are described above to disclose the present invention, they are not intended to limit the present invention, and various changes and modifications may be made by one skilled in the art without departing from the spirit and scope of the present invention. The scope of protection of the present invention therefore is subject to the scope defined by the appended claims.

What is claimed is:

1. A distance detection method for a wireless power transmission device comprising a transmitter circuit having a transmitting coil and a receiver circuit having a receiving coil, wherein the transmitting coil and the receiving coil are magnetically coupled to form an inductive circuit with a magnetizing inductance, and wherein the distance detection method comprises:
    calculating an inductance value of the magnetizing inductance of the inductive circuit according to electrical parameters of the receiver circuit and electrical parameters of the transmitter circuit, wherein the electrical parameters of the receiver circuit include a detected voltage related to an output voltage of the receiver circuit, and the electrical parameters of the transmitter circuit include a reactive current and an operating frequency of the transmitter circuit;
    calculating a distance between the transmitting coil and the receiving coil according to the inductance value of the magnetizing inductance of the inductive circuit.

2. The distance detection method for a wireless power transmission device according to claim 1, wherein the inductance value of the magnetizing inductance of the inductive circuit is calculated according to an equivalent voltage of the transmitting coil, a reactive current of the transmitting coil, and an operating frequency of the transmitter circuit, and the inductance value $L_m$ of the magnetizing inductance of the inductive circuit is calculated according to the following equation:

$$L_m = \frac{V_{eq}}{2\pi f_s I_{t\_r}}$$

wherein $V_{eq}$ is the equivalent voltage reduced to the transmitting coil and $V_{eq}$ is calculated by voltage reduction of the detected voltage related to the output voltage of the receiver circuit, $I_{t\_r}$ is the reactive current of the transmitting coil, and $f_s$ is the operating frequency of the transmitter circuit.

3. The distance detection method for a wireless power transmission device according to claim 2, wherein the transmitter circuit comprises an inverter circuit, a first series compensation circuit and the transmitting coil, wherein the first series compensation circuit is electrically connected between the inverter circuit and the transmitting coil; and the receiver circuit comprises the receiving coil, a second series compensation circuit and a rectifying circuit, wherein the second series compensation circuit is electrically connected between the receiving coil and the rectifying circuit.

4. The distance detection method for a wireless power transmission device according to claim 3, wherein the transmitter circuit further comprises a first transformer circuit electrically connected between the inverter circuit and the first series compensation circuit; and/or the receiver circuit further comprises a second transformer circuit electrically connected between the rectifying circuit and the second series compensation circuit.

5. The distance detection method for a wireless power transmission device according to claim 3, wherein the equivalent voltage $V_{eq}$ of the transmitting coil is obtained by one of the following methods:
   Method 1: obtaining an output voltage $V_{out}$ of the rectifying circuit of the receiver circuit, and performing voltage reduction on the output voltage $V_{out}$ of the rectifying circuit to obtain the equivalent voltage $V_{eq}$ of the transmitting coil;
   Method 2: obtaining an AC voltage $V_{rec}$ before the rectifying circuit of the receiver circuit, and performing voltage reduction on the AC voltage $V_{rec}$ before the rectifying circuit to obtain the equivalent voltage $V_{eq}$ of the transmitting coil.

6. The distance detection method for a wireless power transmission device according to claim 3, wherein the reactive current $I_{t\_r}$ of the transmitting coil is obtained by one of the following methods:
   Method 1: obtaining a total current $I_t$ and an active current $I_{t\_a}$ of the transmitting coil, and calculating the reactive current $I_{t\_r}$ of the transmitting coil according to $I_{t\_r}=\sqrt{I_t^2-I_{t\_a}^2}$;
   Method 2: obtaining a total current $I_t$ of the transmitting coil and a phase difference $\theta$ between an output voltage $V_{inv}$ of the inverter circuit of the transmitter circuit and the total current $I_t$, and calculating the reactive current $I_{t\_r}$ of the transmitting coil according to $I_{t\_r}=I_t*\sin(\theta)$.

7. The distance detection method for a wireless power transmission device according to claim 1, wherein the electrical parameters of the receiver circuit are transmitted to a distance calculation unit at the transmitter via wireless communication or power line carrier communication to be calculated with the electrical parameters of the transmitter circuit; alternatively, the electrical parameters of the transmitter circuit are transmitted to a distance calculation unit at the receiver via wireless communication or power line carrier communication to be calculated with the electrical parameters of the receiver circuit.

8. The distance detection method for a wireless power transmission device according to claim 1, wherein the step of calculating the distance between the transmitting coil and the receiving coil according to the inductance value of the magnetizing inductance of the inductive circuit comprises obtaining the distance between the transmitting coil and the receiving coil by look-up table method or curve fitting method.

9. The distance detection method for a wireless power transmission device according to claim 8, wherein the look-up table method comprises:
   setting the distance between the transmitting coil and the receiving coil to be a plurality of different distance values, and measuring corresponding magnetizing inductance values of the magnetizing inductance of the inductive circuit at the plurality of different distance values, respectively;
   creating a table including a correspondence between the magnetizing inductance values and the distance values according to the results obtained by the measurements;
   querying out from the table which two adjacent distance values form a distance range corresponding to a magnetizing inductance value range that the calculated inductance value of the magnetizing inductance of the inductive circuit falls into, and taking one of the two adjacent distance values as the distance between the transmitting coil and the receiving coil.

10. The distance detection method for a wireless power transmission device according to claim 9, wherein creating the table including a correspondence between the magnetizing inductance values and the distance values further comprises:
    interposing linearly certain distance values and magnetizing inductance values between the plurality of different distance values of the table according to the results obtained by the measurements.

11. The distance detection method for a wireless power transmission device according to claim 8, wherein the curve fitting method comprises:
    setting the distance between the transmitting coil and the receiving coil to be a plurality of different distance values, and measuring the corresponding magnetizing inductance values of the magnetizing inductance of the inductive circuit at the plurality of different distance values, respectively;
    obtaining a relation gap=$f(L_m)$ between the distance value and the magnetizing inductance value by curve fitting method according to the results obtained by the measurements;
    calculating the distance between the transmitting coil and the receiving coil according to the calculated inductance value $L_m$ of the magnetizing inductance of the inductive circuit and the relation gap=$f(L_m)$.

12. A distance detection system for a wireless power transmission device, wherein the wireless power transmission device comprises a transmitter circuit having a transmitting coil and a receiver circuit having a receiving coil, wherein the transmitting coil and the receiving coil are magnetically coupled to form an inductive circuit with a magnetizing inductance, the distance detection system comprising:
    a transmitter detection unit configured to detect electrical parameters of the transmitter circuit;
    a receiver detection unit configured to detect electrical parameters of the receiver circuit;
    a distance calculation unit disposed at a transmitter or a receiver of the wireless power transmission device; and
    a data transmission unit configured to transmit the electrical parameters of the receiver circuit or the electrical parameters of the transmitter circuit to the distance calculation unit via wireless communication or power line carrier communication;
    wherein the distance calculation unit is configured to calculate an inductance value of the magnetizing inductance of the inductive circuit according to the electrical parameters of the receiver circuit and the electrical parameters of the transmitter circuit, and to calculate a distance between the transmitting coil and the receiving coil according to the inductance value of the magnetizing inductance of the inductive circuit.

13. The distance detection system for a wireless power transmission device according to claim 12, wherein the electrical parameters of the receiver circuit include a detected voltage related to an output voltage of the receiver circuit, and that the electrical parameters of the transmitter circuit include a reactive current and an operating frequency of the transmitter circuit.

14. The distance detection system for a wireless power transmission device according to claim 13, wherein the distance calculation unit calculates the inductance value of the magnetizing inductance of the inductive circuit according to an equivalent voltage of the transmitting coil, a reactive current of the transmitting coil, and an operating frequency of the transmitter circuit, and the distance calculation unit calculates the inductance value $L_m$ of the magnetizing inductance of the inductive circuit according to the following equation:

$$L_m = \frac{V_{eq}}{2\pi f_s I_{t\_r}}$$

wherein $V_{eq}$ is the equivalent voltage of the transmitting coil and $V_{eq}$ is calculated by voltage reduction of the detected voltage related to the output voltage of the receiver circuit, $I_{t\_r}$ is the reactive current of the transmitting coil, and $f_s$ is the operating frequency of the transmitter circuit.

15. The distance detection system for a wireless power transmission device according to claim 14, wherein the transmitter circuit comprises an inverter circuit, a first series compensation circuit and the transmitting coil, wherein the first series compensation circuit is electrically connected between the inverter circuit and the transmitting coil; and that the receiver circuit comprises the receiving coil, a second series compensation circuit and a rectifying circuit, wherein the second series compensation circuit is electrically connected between the receiving coil and the rectifying circuit.

16. The distance detection system for a wireless power transmission device according to claim 15, wherein the receiver detection unit is configured to detect an output voltage $V_{out}$ of the rectifying circuit of the receiver circuit and perform voltage reduction on the output voltage $V_{out}$ of the rectifying circuit to obtain an equivalent voltage $V_{eq}$ of the transmitting coil;

alternatively, the receiver detection unit is configured to detect an AC voltage $V_{rec}$ before the rectifying circuit of the receiver circuit and perform voltage reduction on the AC voltage $V_{rec}$ before the rectifying circuit to obtain the equivalent voltage $V_{eq}$ of the transmitting coil.

17. The distance detection system for a wireless power transmission device according to claim 15, wherein the transmitter detection unit is configured to detect a total current $I_t$ and an active current $I_{t\_a}$ of the transmitting coil, and calculate the reactive current $I_{t\_r}$ of the transmitting coil according to $I_{t\_r}=\sqrt{I_t^2-I_{t\_a}^2}$; alternatively, the transmitter detection unit is configured to detect a total current $I_t$ of the transmitting coil and a phase difference θ between an output voltage $V_{inv}$ of the inverter circuit of the transmitter circuit and the total current $I_t$, and calculate the reactive current $I_{t\_r}$ of the transmitting coil according to $I_{t\_r}=I_t*\sin(\theta)$.

18. The distance detection system for a wireless power transmission device according to claim 14, wherein the operating frequency $f_s$ of the transmitter circuit is obtained from a controller directly or detected by a hardware circuit.

19. The distance detection system for a wireless power transmission device according to claim 14, wherein the distance calculation unit obtains the distance between the transmitting coil and the receiving coil by look-up table method or curve fitting method.

* * * * *